United States Patent [19]

Ono et al.

[11] 3,923,824

[45] Dec. 2, 1975

[54] SPIRO (INDOLINE-2,5-ISOXAZOLINE) COMPOUNDS

[75] Inventors: Hisatake Ono; Harumi Katsuyama; Shu Watarai, all of Asaka, Japan

[73] Assignee: Fuji Photo Film Co., Ltd., Kanagawa, Japan

[22] Filed: Jan. 21, 1974

[21] Appl. No.: 436,394

Related U.S. Application Data

[62] Division of Ser. No. 185,818, Oct. 1, 1971, abandoned.

[30] Foreign Application Priority Data

Oct. 1, 1970  Japan.............................. 45-86238

[52] U.S. Cl...................... 260/307 F; 96/1.5; 96/1.6
[51] Int. Cl.[2]......................................... C07D 263/14
[58] Field of Search................................ 260/307 F

[56] References Cited
UNITED STATES PATENTS
3,850,949   11/1974   Ono et al........................ 260/307 F Primary Examiner—Raymond V. Ruch
Attorney, Agent, or Firm—Sughrue, Rothwell, Mion, Zinn & Macpeak

[57] ABSTRACT

A process for the preparation of compounds having a spiro(indoline-2,5'-isoxazoline) structure or repeating unit thereof when said compound is a high molecular weight compound and represented by the general formula (A) which is characterized by reacting an indolenium salt or 2-methyleneindoline with a hydroxamic acid halide in a solvent in the presence of a base:

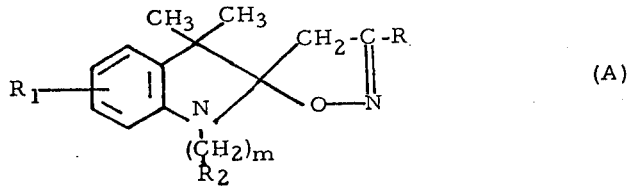

wherein $R_1$ is a hydrogen atom, a halogen atom, an alkyl group having 1 to 4 carbon atoms, an alkoxyl group having 1 to 4 carbon atoms, an alkoxycarbonyl group having alkyl group of 1 to 4 carbon atoms, a nitro group, or an alkylene group having 1 to 3 carbon atoms; $R_2$ is a hydrogen atom, a hydroxyl group, an alkoxycarbonyl group having an alkyl group which has 1 to 4 carbon atoms, a cyan group or a phenyl group; R is an alkylene chain having 1 to 3 carbon atoms, a phenylene group, or a substituted phenyl group wherein said substituted group is a hydrogen atom, a halogen atom, an alkyl group having 1 to 4 carbon atoms or an alkoxyl group having 1 to 4 carbon atoms; and m is an integer from 1 to 4.

1 Claim, No Drawings

SPIRO (INDOLINE-2,5-ISOXAZOLINE) COMPOUNDS

This is a Division of application Ser. No. 185,818, filed Oct. 1, 1971 now abandoned.

BACKGROUND OF THE INVENTION

1. Field of the Invention

This invention relates to spiro(indoline-2,5'-isoxazoline) compounds.

More particularly, the compounds of this invention are prepared by reacting 1,3,3-substituted-2-methylindolenium salts or 1,3,3-substituted-2-methyleneindolines with hydroxamic acid chlorides in the presence of base.

SUMMARY OF THE INVENTION

The process of this invention comprises reacting a 1,3,3-substituted-2-methylindolenium salt, 1,3,3-substituted-2-methyleneindoline, a bis-(1,3,3,-substituted-2-methylindolenium salt), a bis-(1,3,3-substituted-2-methyleneindoline), etc. corresponding to monomers, bis compounds and polymer compounds represented by the following general formula (A) with hydroxamic acid chlorides or bifunctional hydroxamic acid chlorides in the presence of a base.

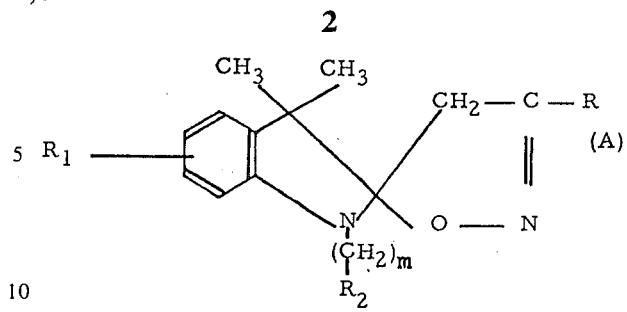

wherein $R_1$ is a hydrogen atom, a halogen atom, an alkyl group having 1 to 4 carbon atoms, an alkoxyl group having 1 to 4 carbon atoms, an alkoxycarbonyl group having an alkyl group which has 1 to 4 carbon atoms, a nitro group, or when said compound is a dimer or polymer $R_1$ can be an alkylene chain having 1 to 3 carbon atoms between adjacent benzene rings; $R_2$ is a hydrogen atom, a hydroxyl group, an alkoxycarbonyl group having an alkyl group which has 1 to 4 carbon atoms, a cyan group or a phenyl group; R is a substituted phenyl group (wherein the substituted group is a hydrogen atom, a halogen atom, an alkyl group having 1 to 4 carbon atoms, or an alkoxy group having 1 to 4 carbon atoms), an alkylene chain having 1 to 3 carbon atoms or when said compound is a dimer or polymer R can be or a phenylene group between adjacent isoxazoline rings; and m is an integer from 1 to 4.

DESCRIPTION OF THE PREFERRED EMBODIMENTS

General formula (A) can be represented by the following general formulas (I) to (IV).

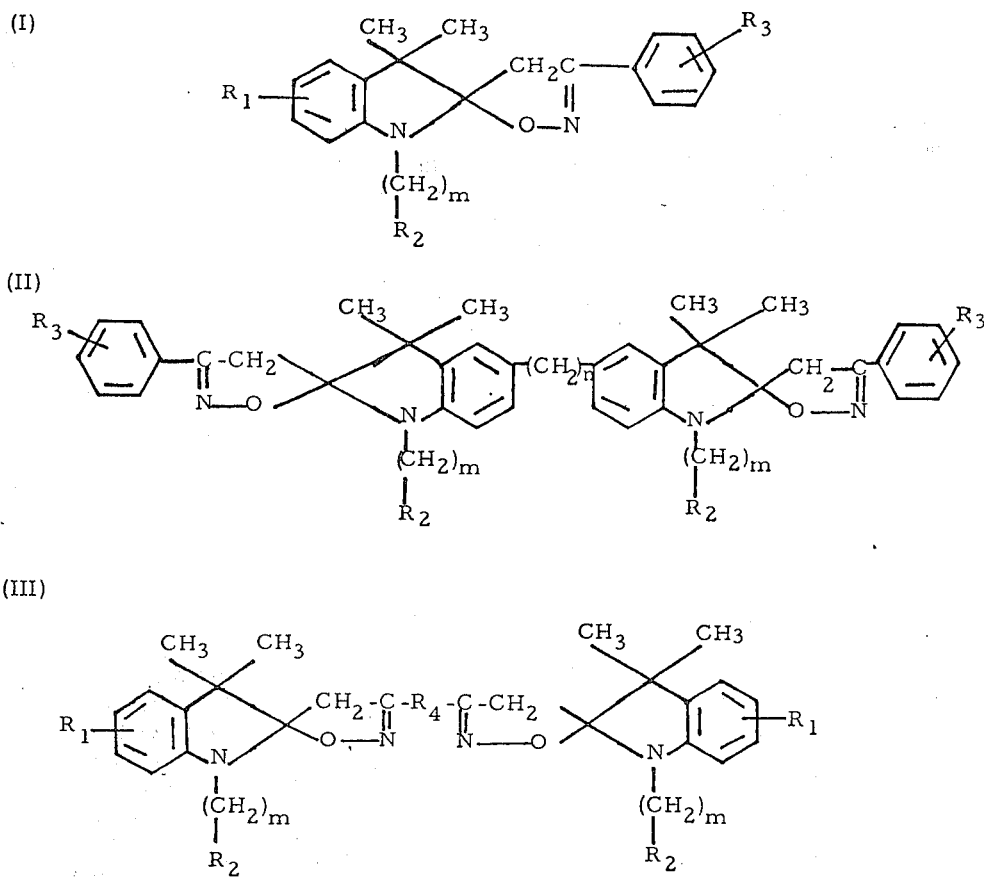

(IV)

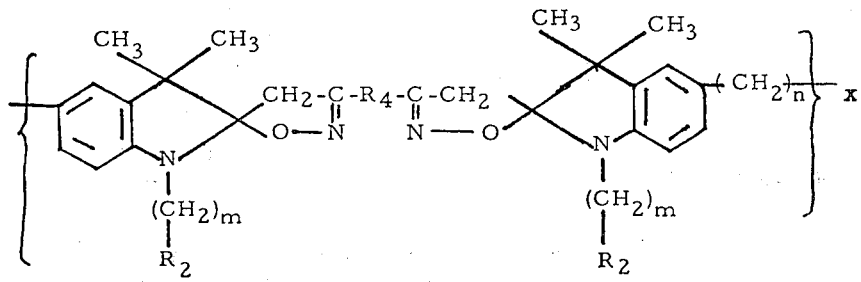

wherein $R_1$ is a hydrogen atom, a halogen atom, an alkyl group having 1 to 4 carbon atoms, an alkoxyl group having 1 to 4 carbon atoms, an alkoxycarbonyl group having an alkyl group which has 1 to 4 carbon atoms, a nitro group or an alkylene chain having 1 to 3 carbon atoms as represented by $(CH_2)_m$; $R_2$ is a hydrogen atom, a hydroxyl group, an alkoxycarbonyl group having an alkyl group which has 1 to 4 carbon atoms, a cyan or a phenyl group; $R_3$ is a hydrogen atom, a halogen atom, an alkyl group having 1 to 4 carbon atoms or an alkoxyl group having 1 to 4 carbon atoms; $R_4$ is an alkylene chain having 1 to 3 carbon atoms or a phenylene group; m is an integer from 1 to 4; n is either zero, the integer 1 or the integer 2; and x is the degree of polymerization. The polymerization degree of the compound represented by the formula (IV) can be determined as set forth in the Examples hereinafter.

Examples of indolenium salts are 1,2,3,3-tetramethylindolenium-p-tosylate, 1-β-hydroxyethyl-2,3,3-trimethylindolenium bromide, 1,2,3,3,5-pentamethylindolenium-p-tosylate, 1,2,3,3-tetramethyl-5-nitroindolenium-p-tosylate and the like, and examples of 2-methyleneindolines are Fischer's base (1,3,3-trimethyl-2-methylene-indoline), 1,3,3-trimethyl-2-methylene-5-chloroindoline, 1-ethyl-2-methylene-3,3-dimethyl-5-methoxyindoline and the like.

Examples of bis-indolenium salts are 5,5'-bis-(1,2,3,3-tetramethylindolenium-p-tosylate), 5,5'-bis-(1-β-hydroxyethyl-2,3,3-trimethylindolenium-p-tosylate) 5,5'-methylene-bis-(1-ethyl-2,3,3-trimethylindolenium iodide), 5,5'-methylene-bis-(1-γ-cyanopropyl-2,3,3-trimethylindolenium-p-tosylate) and the like. Examples of bis-(2-methylene-indoline) are 5,5'-bis-(1,3,3-trimethyl-2-methyleneindoline), 5,5'-methylene-bis(1,3,3-tri methyl-2-methyleneindoline), 5,5'-bis-(1,β-ethoxycarbonyl-2-methylene-3,3-dimethylindoline), 5,5'-bis(1-β, hydroxyethyl-2-methylene-3,3-dimethylindoline) etc.

Examples of hydroxamic acid chlorides are α-chlorobenzaldoxime, α-chloro-p-chlorobenzaldoxime, α-chloro-p-nitrobenzaldoxime, dichloroglyoxime, dichloromalonic dioxime, α, α'-dichloroisophthalic dioxime and the like.

An object of this invention is to provide a process for the preparation of the novel spiro (indoline-2,5'-isoxazoline) compounds of which structures and properties are changeable by the action of radiations such as ultraviolet rays and which have use as highly sensitive photoconductive materials, photosensitive materials and the like.

It is a well-known fact that hydroxamic acid chlorides provide active intermediates of "nitrile oxides" by the reaction with bases and that the active intermediates undergo a 1,3-dipolar cyclo addition type reaction with various multiple bonds such as an acetylene bond, a nitrile bond and a carbonyl bond as described by R. Huisgen in Angewandte Chemie, Vol. 75, P. 604 (1963).

Nitrile oxides form addition compounds with active hydrogen compounds such as amines, therefore as solvents of nitrile oxides, active amines and alcohols are excepted, and ethers such as ether, dioxane, tetrahydrofuran, diglyme and the like, halogenated paraffins such as methylene chloride, chloroform carbon tetrachloride, ethylene chloride, trichloroethylene, perchloroethylene, tetrachloroethane and the like; paraffins such as n-hexane, cyclohexane, heptane and the like, and solvents for high molecular weight compounds such as N,N-dimethyl acetamide, N,N-dimethyl formamide, hexamethyl phosphoramide and the like are suitable.

The reaction of an indolenium salt or 2-methyleneindoline with a hydroxamic acid halide can be conducted in an equal amount of chemical equivalent. That is, each of the reactive compounds of the invention has a specific chemical equivalent and, therefore, the mol. ratio of reactive compounds is varied by the combination of the reactive compounds to be used.

For example, the compounds (I), (II), (III) and high molecular weight compound (IV) are prepared by the reaction of above-mentioned indolenium salt or 2-methylene-indoline with equimolar amount of hydroxamic acid chloride (in the case of (I)), by the reaction of bis-indolenium salt or bis-2-methyleneindoline with hydroxamic acid chloride in molar ratio of 1 : 2 (in the case of (II)), by the reaction of indolenium salt or 2-methylene-indoline with bifunctional hydroxamic acid chloride in molar ratio of 2 : 1 (in the case of(III)), and in the case of high molecular weight compound (IV) by dissolving bis-indolenium salt or bis(2-methylene-indoline) and equimolar amount of bifunctional hydroxamic chloride in an above-mentioned inert solvent and adding dropwise equimolar or an excess amount of base at a temperature from −30°C. to 100°C. (generally at the preferred room temperature).

As a base, tertiary alkyl amines, secondary alkyl amines or aromatic amines such as triethyl amine, tributyl amine, piperidine, pyridine and the like, and alkali metal salts such as sodium hydroxide, potassium hydroxide, sodium carbonate, sodium acetate and the like may be used.

The reaction proceeds very rapidly and is almost completed for from several minutes to several tens of minutes, but, if circumstances require, stirring may be continued for several hours in order to complete the reaction. After the completion of the reaction, in the cases of (I), (II), and (III), crystals are obtained by washing the reaction mixture with water, drying and concentrating. They are purified by recrystallization from a suitable solvent. In the case of (IV), the reaction mixture is poured into a large quantity of solvent such as methanol whereby high molecular weight compounds are separated. If circumstances require, this operation may be carried out after filtration of the separated substances in the reaction mixture or after concentration of the reaction mixture. Separated high molecular weight compounds are purified by reprecipitation in a suitable solvent.

The compounds of this invention having structures of spiro (indoline-2,5'-isoxazoline) were confirmed by analyses of infrared absorption spectrum, ultraviolet absorption spectrum, nuclear magnetic resonance spectrum (NMR), mass spectrum, etc. For instance, a compound isolated from the reaction mixture of 1,3,3-trimethyl-2-methylene-5-chloroindoline with α-chlorobenzaldoxime according to above-mentioned process had the following analysis of its elements: carbon 69.49%, hydrogen 5.86%, and nitrogen 8.36%. This result was in good agreement with the theoretical value of 1,3,3-trimethyl-5-chloro-3'-phenyl-spiro (indoline-2,5'-isoxazolene) ($C_{19}H_{19}N_2OCl$) of carbon 69.59%, hydrogen 5.86%, and nitrogen 8.57%. Furthermore, the agreement was supported by the fact that parent peak (M+) of the mass spectrum was 326, and the compound had the absorption in an infrared absorption spectrum at 1560 cm$^{-1}$ which agreed with $\nu_{C=N}$ and had a maximum absorption in the ultraviolet absorption spectrum at 262 m$\mu$($\epsilon$=2.58 × 10$^4$). On the basis of these absorptions it was concluded that the compound has an indoline type structure altered from methylene-indoline type structure of the starting material. Moreover, in the NMR spectrum (in CDCl$_3$ solution with tetramethylsilane as an internal reference) the compound had peaks at δ value (as ppm) 1.25 (S, 3H), 1.34 (S, 3H) 2.61 (S, 3H), 3.03, 3.33, 3.38, 3.69 (AB type 2H, J = 18:0 cps.) and a ring proton (8H) was observed.

On the basis of above-mentioned data it is obvious that the compound of this invention has a spiro (indoline-2,5'-isoxazoline) structure.

Meanwhile, a high molecular compound obtained by the reaction of 5,5'-methylene-bis-(1,3,3-trimethyl-2-methylene-indoline) with dichloroglyoxime had a maximum absorption in the ultraviolet absorption spectrum at 262 m$\mu$, and in the NMR spectrum the high molecular weight compound had peaks at δ value (as ppm) 1.24(S), 1.37(S), 2.66(S), 3.01, 3.34, 3.67 (transition type to A$_2$ type from AB type) and the intensity ratio of ring proton peaks was 6:6:4:2:6. The infrared absorption spectrum nearly agreed with the spectrum of the monomer. From these data it is obvious that the high molecular weight compound of this invention has a structure containing spiro (indoline-2,5'-isoxazoline) as a repetition unit.

The high molecular weight compounds of this invention are soluble in various organic solvents such as coloroform, tetrahydrofuran, N,N-dimethylformamide, N,N-dimethylacetamide, N-methyl-2-pyrrolidone and the like, and are so highly polymerized that they give a strong film when applied as a solution of the polymer in a lower boiling solvent such as tetrahydrofuran to a metallic plate and dried. Their reduced viscosity values ($\eta$ sp/c) are about from 0.03 to 0.6.

The following examples illustrate this invention more fully.

EXAMPLE I

To a solution of 1.09 g. (0.005 mol) of 1,3,3-trimethyl-2-methylene-5-nitro-indoline and 0.73 g. (0.005 mol) of benzhydroxamic acid chloride in 20 ml, of ether was dropwise added 10% aqueous sodium hydroxide solution. After reacting for 30 minutes at room temperature, the ether layer was separated, and the aqueous layer was extracted with ether several times, and the whole ether solution was dried over anhydrous sodium carbonate and concentrated whereby pale yellow crystals were nearly quantitatively obtained.

Melting point : 210.5 - 211.5°C. (from ethanol/tetrahydrofuran)

Elemental analysis:

Found (%) : C=67.57; H=5.67; N=12.48.

Calculated (%) : C=67.64; H=5.68; N=12.46.

Spiro-(indoline 2,5'-isoxazoline) compounds prepared similarly from 2-methyleneindoline derivatives and substituted benzhydroxamic acid chlorides are illustrated in Table 1.

TABLE 1

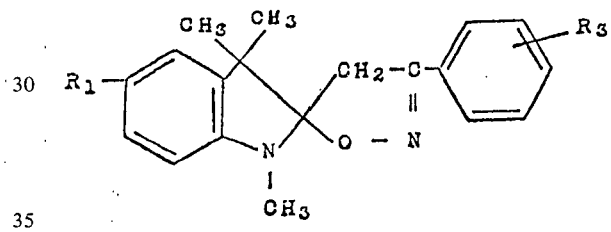

| compound No. | R$_1$ | R$_3$ | M.P. (°C) | βλCHCl$_3$ max(m$\mu$),($\epsilon$) |
|---|---|---|---|---|
| 1 | —H | —H | 118 | 260 (1.95×10$^4$) |
| 2 | —Cl | —H | 167–168 | 262 (2.58×10$^4$) |
| 3 | —H | —Cl | 170–171 | 268 (2.18×10$^4$) |
| 4 | C$_2$H$_5$OCO— | —H | 123–124 | 304 (3.07×10$^4$) |
| 5 | —NO$_2$ | —Cl | 184–185 | {265 (2.16×10$^4$) / 372 (2.04×10$^4$)} |
| 6 | —NO$_2$ | —H | 210.5–211.5 | {260 (1.83×10$^4$) / 373 (2.13×10$^4$)} |
| 7 | CH$_3$O— | —H | 155 | 259 (1.94×10$^4$) |
| 8 | —H | —CH$_3$ | 140 | 160 (2.05×10$^4$) |

EXAMPLE 2

To a solution of 1.73 g. (0.01 mol) of 1,3,3-trimethyl-2-methyleneindoline and 0.78 g. (0.005 mol) of dichloroglyoxime in 20 ml of ether was added 10% aqueous sodium hydroxide solution.

By the similar treatment as in Example 1, 3',3''-bis[1,3,3-trimethyl-spiro (indoline-2,5'-isoxazoline)] was obtained quantitatively.

Melting Point: 231°C.

Elemental Analysis:

Found (%) : C=72.76: H=7.11; N=13,04.

Calculated (%) : C=72.53; H=7.02; N=13.01.

TABLE 2

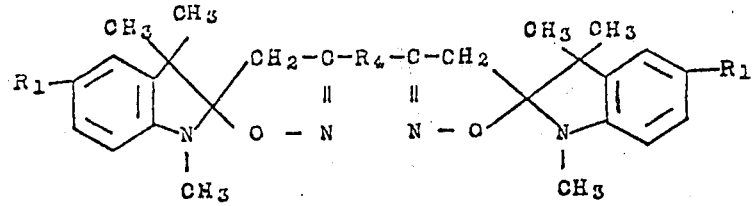

Table II—Continued

| compound No. | $R_1$ | $R_4$ | M.P.(°C) | $\beta\lambda CHCl_3$ max (m$\mu$),($\epsilon$) |
|---|---|---|---|---|
| 9 | —H | * m | 231 | 259 ($3.06 \times 10^4$) |
| 10 | —Cl | * m | 154 | 262 ($4.06 \times 10^4$) |
| 11 | $C_2H_5OCO$— | * m | 242 | 305 ($4.64 \times 10^4$) |
| 12 | —H | —$CH_2$— | 200 | 259 ($3.30 \times 10^4$) |
| 13 | —H | ‑$(CH_2)_3$‑ | 185 | 259 ($3.21 \times 10^4$) |
| 14 | —H |  | 273 | 299 ($3.30 \times 10^4$) |

* direct bond of carbon atoms

EXAMPLE 3

In 50 ml of methylene chloride were dissolved 1.79 g. (0.005 mol) of 5,5'-methylene-bis (1,3,3-trimethyl-2-methyleneindoline) and 1.55 g. (0.01 mol) of benzhydroxamic acid chloride while the solution was stirred at room temperature. Then to the solution 2 ml of triethylamine was added whereby crystals of triethylamine hydrochloride separated. After additional stirring for 30 minutes at room temperature for the completion of reaction, the separated crystals were filtered off. Concentration of the filtrate gave 2.6 g. (quantitatively) of light yellow 5,5''-methylene-bis-[1,3,3-trimethyl-3'-phenyl-spiro (indoline-2-5'-isoxazoline)].

Melting Point: 196°C.
Elemental Analysis:
Found (%) : C=78.79; H=6.75; N=9.35.
Calculated (%) : C=78.49; H=6.76; N=9.36.

point was above 300°C. and the reduced viscosity ($\eta$sp/c, 1 weight percent concentration, 30.0°C., tetrahydrofuran solution) was 0.49.

EXAMPLE 5

In 200 ml of tetrahydrofuran were dissolved 1.8 g. (0.005 mol) of 5,5'-bis- (1,3,3-trimethyl-2-methyleneindoline) and 1.2 g. (0.005 mol) of dichloroterephthalic dioxime while the solution was stirred at room temperature.

To the solution was dropwise added 2 ml of triethylamine whereby the reaction solution changed from a yellowish brown color to a green color and triethylamine hydrochloride precipitated. After an additional stirring for about 30 minutes, the reaction solution was poured into 1,500 ml of methanol whereby a light green precipitate resulted. The compound was already

TABLE 3

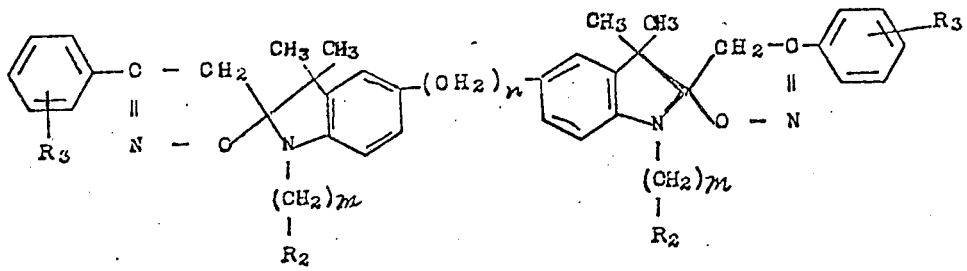

| compound No. | n | m | $R_2$ | $R_3$ | M.P. (°C) | $\beta\lambda CHCl_3$ max(m$\mu$),($\epsilon$) |
|---|---|---|---|---|---|---|
| 16 | 0 | 2 | —$COOC_2H_5$ | —H | 210 | 265 ($5.78 \times 10^4$) |
| 17 | 1 | 1 | —H | —H | 196 | 264 ($4.32 \times 10^4$) |
| 18 | 1 | 1 | —H | p—Cl— | .250 | 274 ($3.97 \times 10^4$) |

EXAMPLE 4

In 150 ml of tetrahydrofuran were dissolved 1.8 g. (0.005 mol) of 5,5'-methylene-bis- (1,3,3-trimethyl-2-methyleneindoline) and 0.8 g. (0.005 mol) of dichloroglyoxime while the solution was stirred at room temperature.

To the solution was dropwise added 2 ml of triethylamine whereby the reaction mixture grew rose color, orange color, light orange color and finally nearly colorless and at the same time crystals of triethylamine hydrochloride separated. After an additional stirring for 20 minutes after the completion of the addition, the reaction mixture was poured into 1,500 ml of methanol whereby a nearly colorless precipitate of 2.0 g. was obtained (90% of theory).

The precipitate was dissolved in tetrahydrofuran and purified by re-precipitation in methanol. The melting insoluble in the usual organic solvents, but very slightly soluble in N-methylpyrrolidone. The yield was 2.6 g. and nearly quantitative, and the melting point was above 300°C..

EXAMPLE 6

A mixture of 3.5 g. (0.005 mol) of 5,5'-methylene-bis- (1,3,3,4-tetramethylindolenium-p-tosylate) and 20 ml of triethylamine was refluxed for 1 hour. Then the mixture was cooled to room temperature, and a solution of 0.8 g. (0.005 mol) of dichloroglyoxime in 150 ml of tetrahydrofuran was added at one time. Then the mixture was stirred for 3 hours at room temperature. The reaction mixture was poured into 1,500 ml of methanol whereby 2.0 g. of a light yellow precipitate was obtained.

The precipitate was purified by dissolving in tetrahydrofuran and reprecipitating in methanol. The melting point was 230° to 240°C., and the reduced viscosity (ηsp/c, 1 weight percent concentration, 30.0°C., tetrahydrofuran solution) was 0.11.

TABLE 4

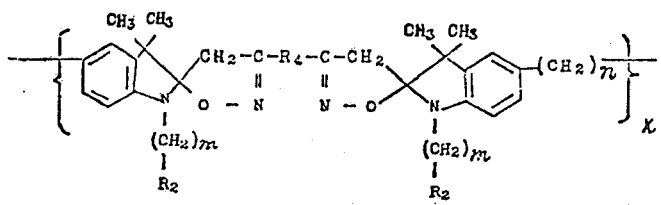

| compound No. | n | m | $R_2$ | $R_4$ | reaction No. (hr) | Yield (%) | M.P. (°C) | nSP/C(solvent) |
|---|---|---|---|---|---|---|---|---|
| 19 | 0 | 1 | —H | * — | 1 | 80 | 273~275 | 0.15(T.H.F.) |
| 20 | 1 | 1 | —H | * — | 20/60 | 90 | above 300 | 0.49(T.H.F.) |
| 21 | 1 | 1 | —H | * — | 3 | 90 | 230~240 | 0.11(T.H.F.) |
| 22 | 1 | 2 | —$CO_2C_2H_5$ | * — | 20/60 | 70 | 174~185 | 0.06(T.H.F.) |
| 23 | 1 | 1 | —H | ⟨phenyl⟩ | 1 | 90 | above 300 | 027(N.M.P.) |
| 24 | 0 | 1 | —H | ⟨biphenyl⟩ | 20/60 | Quantitative | above 300 | Impossible to measure |
| 25 | 1 | 1 | —H | ⟨phenyl⟩ | 1 | 80 | above 300 | 0.15(N.M.P.) |
| 26 | 0 | 3 | —CN | * — | 1 | 90 | above 300 | 0.11(T.H.F.) |
| 27 | 2 | 2 | —OH | * — | 1 | 50 | 150~270 | 0.07(T.H.F.) |

* Direct bond of carbon atoms.

where T.H.F. represents tetrahydrofuran, N.M.P. represents N-methyl-2-pyrrolidone and ηsp/c are values which are measured at a temperature of 30°C and at a concentration of .1 weight percent.

What is claimed is:

1. A polymer having the repeating unit represented by the Formula (IV):

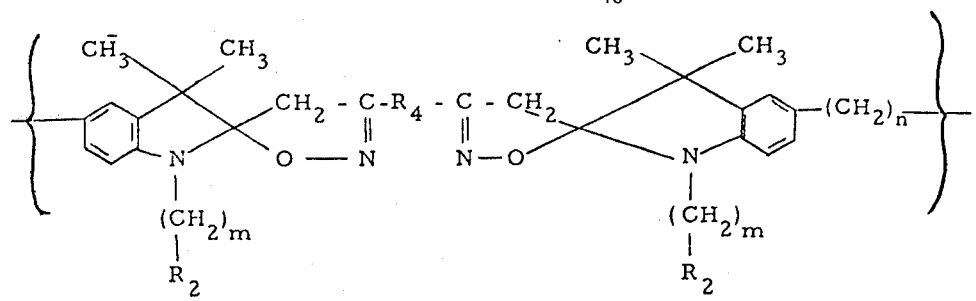

wherein $R_2$ is hydrogen, hydroxyl, alkoxycarbonyl having alkyl which has 1 to 4 carbon atoms, cyan or phenyl; $R_4$ is either a direct bond of carbon atoms, an alkylene chain having 1 to 3 carbon atoms or phenylene, m is an integer from 1 to 4; n is either zero, the integer 1 or the integer 2; said polymer having a reduced viscosity of from 0.03 to 0.6 in a one weight percent concentration of tetrahydrofuran at 30.0°C.

* * * * *